:::header
2,792,310
Patented May 14, 1957
:::

2,792,310

PRODUCTION OF A MUTUAL SOLID SOLUTION OF TiC AND TiO

Morris A. Steinberg, Shaker Heights, and Eugene Wainer, Cleveland Heights, Ohio, assignors, by mesne assignments, to Horizons Titanium Corporation, Princeton, N. J., a corporation of New Jersey No Drawing. Application July 21, 1953,
Serial No. 369,512

4 Claims. (Cl. 106—43)

The present invention relates to the production of a mutual solid solution of titanium carbide and titanium monoxide in which the constituent elements are present in molar ratios that make the product particularly useful in the electrolytic production of titanium metal.

Titanium metal, in its relatively pure form, has many valuable properties which make this metal of increasing commercial importance. Although it is difficult to obtain in the desired degree of purity, recent investigations have indicated that substantially pure metallic titanium can be obtained by the electrolysis of certain titanium compounds in a fused salt diluent bath. In the production of metallic titanium by electrolysis, it has been found particularly desirable to use as a source of titanium a mutual solid solution of titanium carbide and titanium monoxide, hereinafter referred to as the carbide-monoxide product. To be useful in this process, however, the titanium carbide-monoxide product must be substantially pure and must contain titanium, oxygen and carbon in certain specific proportions in order to produce a titanium metal product that will be free from unreduced oxides or carbides of that metal. Moreover, in order for the electrolysis of the carbide-monoxide product to be of commerical importance, it is necessary to have an abundant and economical supply of this product of the necessary degree of purity.

The present invention contemplates the production of such high purity solid solutions of titanium carbide and titanium monoxide by the treatment of commercially available oxides of titanium such as titanium dioxide and titanium sesquioxide. We have found that a titanium carbide-monoxide product of the necessary degree of purity can be produced by heating such oxides of titanium in the presence of elemental carbon provided that the reactants are combined in the proper proportions and that certain specific reaction conditions of atmosphere and temperature are observed. Our investigation of the reactions taking place between carbon and the higher oxides of titanium indicate that these reactions are reversible in the presence of carbon monoxide and, moreover, that the original reactants may not be reconstituted by this reversal. As a result, a mixture of oxides and carbides of titanium in unpredictable proportions may be present in the final product obtained by a reaction carried out in the presence of the evolved carbon monoxide. Moreover, we found that the conversion of titanium dioxide to the carbide-monoxide product proceeds in two well-defined reaction stages, the first of which involves the reduction of the titanium dioxide to titanium sesquioxide and the second of which involves the conversion of the titanium sesquioxide to the desired mutual solid solution of titanium carbide and titanium monoxide. Each of these stages must be carried out within specific and well-defined temperature ranges and under conditions that insure the removal of the carbon monoxide from the reaction zone so that reversal of the reaction is minified.

Our process for producing a mutual solid solution of titanium monoxide and titanium carbide comprises forming an intimate mixture of substantially pure titanium sesquioxide with substantially pure carbon, the molar amount of carbon present in the mixture being greater than one but not more than three times that of the titanium sesquioxide. The mixture is heated to a reaction temperature within the range of about 1500° to 1800° C., and carbon monoxide is removed from the reaction zone substantially as rapidly as it is evolved. The reaction temperature is maintained until the evolution of carbon monoxide substantially ceases. The resulting substantially pure carbide-monoxide product comprises a mutual solid solution of titanium monoxide and titanium carbide in which the molar ratio of the carbide to monoxide does not exceed one and is particularly useful as a source of titanium in the electrolytic production of titanium in a fused salt bath.

Our invention further contemplates the combination with the reaction between titanium sesquioxide and carbon of a preceding reaction in which titanium dioxide is reduced to titanium sesquioxide in an atmosphere maintained substantially free from carbon monoxide whereby the sesquioxide is produced substantially free from other oxides of titanium. This reduction of titanium dioxide to titanium sesquioxide is advantageously effected by forming an intimate mixture of the dioxide with at least one-half mol but not more than two mols of elemental carbon per mol of titanium dioxide. The mixture is heated to a reaction temperature within the range of about 1100° to 1200° C. and the evolved carbon monoxide is removed from the reaction zone substantially as rapidly as it is formed. The reaction temperature is maintained until the evolution of carbon monoxide substantially ceases whereupon titanium sesquioxide substantially free from other oxides of titanium may be recovered.

To be useful as a source of titanium in the electrolytic production of titanium metal, the constituent elements of the carbide-monoxide product should be present in proportions that do not exceed certain specific ratios. That is, the ratio of the titanium carbide component to the titanium monoxide component of the carbide-monoxide product should not exceed 1:1 but may be less than 1:1. The preferred atomic ratio of titanium:carbon:oxygen is 2:1:1. The molar proportions of the constituent elements in the carbide-monoxide product are largely determined by the proportions of the reactants in the original reaction mixture. For example, a mixture of one mol of titanium sesquioxide and three mols of carbon will yield a titanium carbide-monoxide product in which the atomic ratio of titanium:carbon:oxygen is 2:1:1. Similarly, a mixture containing one mol of titanium dioxide and two mols of carbon will, if reacted in accordance with our two-stage procedure, yield a mutual solid solution of titanium monoxide and titanium carbide in which there are present two atoms of titanium for each atom of oxygen and each atom of carbon (i. e., equimolar proportions of titanium monoxide and titanium carbide). The use of less than the aforementioned amounts of carbon in these examples leads to the production of a carbide-monoxide product containing a greater than 1:1 ratio of the monoxide to the carbide components of the product.

The purity of the titanium carbide-monoxide product, as well as the relative proportions of the constituent elements thereof, determine the usefulness of the product for the production of titanium metal. The freedom of the carbide-monoxide product from undesirable higher oxides of titanium is largely dependent upon observance of the temperature and atmospheric conditions specified herein. However, it is evident that the purity of the final product is also dependent upon the purity of the initial reactants. For example, the titanium sesquioxide that is reacted with carbon to form a final product must be substantially free from other oxides of titanium. Such titanium sesquioxides may be produced in several ways. One such method, described in the copending patent application of Merle E. Sibert and Stuart S. Carlton Ser. No. 289,880, filed May 24, 1952, now United States Patent 2,681,851, involves heating titanium dioxide in the presence of titanium carbide at a temperature within the range of 1000° to 1200° C. An alternative method for the production of titanium sesquioxide involves heating titanium dioxide in a stream of hydrogen at a temperature of about 1500° C. We prefer, however, to reduce titanium dioxide to titanium sesquioxide with carbon at the temperatures and under the atmospheric conditions described herein.

The titanium dioxide used for this purpose should be of high purity in order to obtain a carbide-monoxide product of satisfactory quality without further troublesome purification procedures being required. However, naturally occurring sources of the dioxide, such as rutile or ilmenite, which have been placed in substantially pure form by conventional methods of beneficiation, may be used as a starting material. When ilmenite (a titaniferous iron ore) is used, the titanium carbide-monoxide product contains substantial quantities of metallic iron which must be separated therefrom. This may be accomplished by crushing the reaction product to minus 325 mesh (Tyler standard) so that the metallic iron may be separated by means of magnetic separators. We prefer, however, to use pigment grade titanium dioxide as the starting material so that the carbide-monoxide product obtained will require no further chemical or physical treatment to place it in useful condition.

The carbon which may be used to reduce the titanium dioxide to titanium sesquioxide and that which is used to convert the titanium sesquioxide to the desired titanium carbide-monoxide product should be as pure as it is possible to obtain. We prefer a pure form of carbon such as lamp-black or petroleum coke having a particle size of minus 325 mesh (Tyler standard), both advantageously further purified by calcination in a neutral atmosphere to a temperature of at least 2500° F. (1371° C.). Calcination of the carbon at this temperature removes substantially all of the residual volatile constituents and results in a product having a carbon content of at least 99% elemental carbon that is eminently suited for separately reducing titanium dioxide and titanium sesquioxide in accordance with our invention.

To effect the separate reduction of titanium dioxide and titanium sesquioxide with elemental carbon in accordance with our invention, the finely divided reactants are intimately mixed together to form the prescribed reaction mixtures. In the titanium dioxide and carbon reaction mixture, there must be at least one-half mol of elemental carbon for each mol of titanium dioxide present in the mixture in order to reduce the dioxide to an equivalent quantity of titanium sesquioxide. Titanium sesquioxide does not react with carbon to any significant extent at the temperatures reached during the reduction of titanium dioxide, that is, at temperatures within the range of about 1100° to 1200° C. It is possible, therefore, to incorporate in the initial reaction mixture an amount of element carbon beyond that which is sufficient to convert the titanium dioxide to titanium sesquioxide. Such additional carbon is intimately mixed with the sesquioxide product and is available for reaction therewith to form the desired mutual solid solution of titanium carbide and titanium monoxide.

To form this carbide-monoxide product, the molar amount of carbon in the reaction mixture of elemental carbon and titanium sesquioxide should be greater than one but not more than three times that of the titanium sesquioxide therein. Equimolar proportions of carbon and titanium sesquioxide will result in the formation of titanium monoxide without the formation of any titanium carbide while an amount of carbon in excess of three times that of the titanium sesquioxide will result in the formation of a carbide-monoxide product in which the molar ratio of carbide to monoxide exceeds 1:1. A carbide-monoxide product in which the carbide to monoxide ratio is less than 1:1 is permissible. However, a product containing no carbide at all, for example, titanium monoxide, which would result from an equimolar titanium sesquioxide and carbon reaction mixture, would not be the carbide-monoxide product contemplated in the present invention.

The carbon required for the conversion of titanium sesquioxide to the carbide-monoxide product may be incorporated in an initial reaction mixture of titanium dioxide and carbon, or it may be added separately to the sesquioxide product of this reaction mixture. If such additional carbon is incorporated in such an initial reaction mixture, there should be present in the mixture more than one mol but not more than two mols of carbon for each mol of titanium dioxide. The reaction product of this initial reaction mixture will then contain more than one-half mol but no more than one and one-half mols of unconsumed carbon for each one-half mol of titanium sesquioxide produced. The unconsumed carbon and the sesquioxide are thus present in the specified proportions and may, therefore, be reacted without further modification to form the titanium carbide-monoxide product pursuant to our invention. If the initial reaction mixture contains less than one mol but, of course, at least one-half mol of carbon, the sesquioxide product thereof will not contain sufficient carbon to convert all of the sesquioxide to the carbide-monoxide product. In such case, therefore, it is necessary to incorporate in the sesquioxide product additional elemental carbon in order to form a mixture of carbon and titanium sesquioxide having the necessary molar proportions for reaction to obtain the desired solid solution of titanium carbide and titanium monoxide.

The reaction between titanium sesquioxide and carbon with the resulting formation of the mutual solid solution of titanium carbide and titanium monoxide takes place in the solid state at a reaction temperature within the range of about 1500° to 1800° C., and preferably within the range of about 1700° C. to 1750° C. As hereinbefore pointed out, the reaction results in the formation and evolution of carbon monoxide which should be removed from the reaction zone substantially as rapidly as it is formed to prevent reaction between the carbon monoxide and the titanium carbide-monoxide product. When the reaction is carried out in the solid state, the carbon monoxide evolves freely from the reaction mixture and may be removed from the reaction zone without difficulty. However, should the temperature of the reaction mixture become high enough to cause partial or complete fusion of the reaction mixture, the evolved carbon monoxide tends to dissolve in or become combined with the fused reaction product and, therefore, to be retained in this product as a deleterious contaminant. By maintaining the temperature of the reactants and reaction product below about 1800° C. until the reaction is complete and the evolution of carbon monoxide has substantially ceased, the desired mutual solid solution of titanium carbide and titanium monoxide will be formed in the solid state and a reaction product will be obtained which is free from dissolved or combined carbon monoxide.

Although the desired mutual solid solution of titanium carbide and titanium monoxide is formed in the solid state at temperatures within the range of about 1500 to 1800° C., the physical character of the solid solution is dependent to a large extent upon the temperature at which the solution is formed and the ultimate temperature to which it is heated. Thus, the reaction between titanium sesquioxide and carbon at relatively low temperatures within the specified range of 1500° to 1800° C. will result in the formation of a lustreless grey mass of fine particles composed of the desired mutual solid solution. At somewhat higher temperatures within, say, the preferred range of 1700° to 1750° C., the resulting carbide-monoxide product comprises a tightly sintered mass of silver grey crystals having a somewhat brighter appearance. For many purposes, it is advantageous to obtain the carbide-monoxide product in the form of a fused, rather than sintered, mass. Therefore, if, after cessation of evolution of the carbon monoxide, the carbide-monoxide product is heated to the fusion temperature of the product substantially in excess of 1800° C., the product will be obtained in the form of a substantially fused silvery grey crystalline mass.

The successive reduction of titanium dioxide to titanium sesquioxide and of titanium sesquioxide to the desired titanium carbide-monoxide with substantially pure carbon is advantageously carried out in a container such as a graphite crucible. The reactants should not be permitted to come into contact with extraneous carbon or, for that matter, with any other material which might adversely effect the purity of the reaction product. Therefore, when a graphite crucible is used as a container for the reactants, the inside of the container in contact with the reactants should be lined with a material such as moylbdenum which is substantially inert to the reaction mixture up to the maximum temperature of 1800° C. Fortunately, however, the finely divided reactants tend to shrink as the temperature is raised above about 800° C. and the mass thus withdraws from contact with the side and top walls of the furnace. Ordinarily, therefore, it is necessary to line only the bottom of such a graphite container with sheet moylbdenum.

The container in which the reaction mixture is received is placed within a suitable furnace provided with facilities for controlling its atmosphere and temperature. The furnace should be equipped with auxiliary apparatus to permit the maintenance of an inert atmosphere therein. Such auxiliary apparatus may comprise means for continuously sweeping the interior of the furnace with an inert gas such as argon or the like, or, preferably, it may comprise a vacuum pump connected to the furnace for continuously removing substantially all gas therefrom. Electric furnaces, such as electric resistance or induction furnaces equipped with a high speed vacuum pump, are particularly advantageous for carrying out the method of producing the titanium carbide-monoxide product in accordance with our invention.

In the preferred practice of our invention, the initial reactants comprise an intimate mixture of finely divided pigment grade titanium dioxide and substantially pure carbon having a particle size of minus 325 mesh (Tyler standard). The reactants may, if desired, be briquetted but ordinarily it is sufficient merely to tamp the reaction mixture into the reaction vessel. In the latter case holes are advantageously formed in the tamped mass to allow evolved gases to escape therefrom. After the charge of reactants has been placed in the reaction vessel, an inert atmosphere is established therein, preferably by means of a high speed vacuum pump capable of lowering the pressure within the vessel to below about 100 microns of mercury by evacuating substantially all gas therefrom. When the pressure within the vessel has been reduced below about 100 microns, the heating of the charge is commenced and its temperature is raised until it is within the range of about 1100° to 1200° C. Active vacuum pumping is continued and the temperature is maintained within the range of 1100° to 1200° C. until the conversion of titanium dioxide to titanium sesquioxide is complete. The reaction between titanium dioxide and carbon proceeds quite rapidly within this temperature range and is accompanied by the evolution of carbon monoxide that continues until the reaction is complete. Although the carbon monoxide evolved from the reaction mixture is removed from the reaction zone by means of the active vacuum pumping substantially as soon as it is formed, it nevertheless causes an appreciable rise in pressure within the reaction vessel, the magnitude of the pressure rise being determined by the capacity of the vacuum pump employed. The completion of the reaction is thus indicated externally by a drop in pressure within the reaction vessel but, to insure uniform heating of the reactants and substantial stoichiometric completion of the reaction, the reaction temperature should be maintained within the specified range for at least 45 minutes after the pressure drops once again to about 100 microns. On completion of this stage of our process, a titanium sesquioxide product substantially free from higher oxides of titanium is obtained that may be reacted with a further amount of carbon to produce the desired titanium carbide-monoxide product.

Titanium sesquioxide produced in the manner described is reacted with a further quantity of substantially pure carbon to convert the sesquioxide to a substantially pure carbide-monoxide product. The molar amount of carbon used is preferably three times that of the titanium sesquioxide. As described hereinbefore, required carbon may advantageously be incorporated in the reaction mixture when it is first introduced into the reaction vessel so that the conversion of the sesquioxide to the desired carbide-monoxide product may be carried out, on completion of the first stage reaction, without necessitating removal of the reactants from the reaction vessel. The titanium sesquioxide and carbon are heated together in the inert atmosphere to a temperature within the range of about 1500° to 1800° C., and preferably within the range of about 1700° to 1750° C. When the reactants reach the temperature specified carbon monoxide is again evolved therefrom and again the pressure within the reaction vessel rises as a result thereof. The active vacuum pumping and the heating are continued until the pressure once again drops to below about 100 microns of mercury, and the reaction mass is thereafter maintained within the aforesaid elevated temperature range for at least 45 minutes after the drop in pressure to insure completion of the reaction. The power is then shut off and the reaction mass is allowed to cool to about 200° C. while still under vacuum. The vacuum pump is then shut off and the mass cooled to room temperature. A reaction product comprising a mutual solid solution of titanium carbide and titanium monoxide substantially free from other oxides of titanium is thereupon recovered. If ilmenite was used as a starting material, this product may be crushed to permit separation of metallic iron therefrom.

The reactions by means of which the desired mutual solid solution of TiC and TiO is obtained in accordance with the previously described procedures, may be represented as follows:

$$2TiO_2 + C \xrightarrow{1100-1200° C.} Ti_2O_3 + CO \quad (1)$$

$$Ti_2O_3 + 3C \xrightarrow{1500-1800° C.} TiC.TiO + 2CO \quad (2)$$

The following examples illustrate, but do not limit, our invention:

Example I $$2TiO_2 + 4C \rightarrow TiO.TiC + 3CO \quad (3)$$

A reaction mixture was prepared by mixing 1600 parts by weight of pigment grade titanium dioxide with 480 parts of minus 325 mesh lampblack which had been previously purified by calcining to a temperature about 2500° F. After thorough mixing, the titanium dioxide and carbon were tamped into a graphite container fitted with a sheet of molybdenum covering the bottom thereof. Holes about one quarter of an inch in diameter, and spaced approximately one inch apart, were pierced through the mass from top to bottom about the entire circumference to allow envolved gas to escape. The charged graphite container was placed in an induction furnace fitted with a high speed vacuum pump capable of establishing a pressure of about 50 microns of mercury at room temperature within the furnace. The furnace was sealed and the pump was operated until a reduced pressure of this order was established, whereupon heating of the furnace and of the reactants therein was commenced. After about 60 minutes the temperature of the reactants reached approximately 1150° C. at which temperature level they were held throughout the first stage of the process. The pressure within the furnace began to rise when the temperature reached about 1000° C. and, in spite of continuous active vacuum pumping, reached a peak of about one-half an atmosphere at the height of the reaction at the aforesaid temperature level of about 1150° C. As the reduction of titanium dioxide to titanium sesquioxide neared completion, the pressure gradually fell to approximately 100 microns due to gradual cessation of carbon monoxide evolution. To insure completion of the reaction, however, the reactants were held at the aforesaid temperature level for an additional 60 minutes while maintaining vacuum conditions. On thus completing the first reaction, the temperature of the reactants was raised to about 1725° C. to convert the titanium sesquioxide to titanium carbide-titanium monoxide solid solution. At about 1500° C. the pressure within the furnace started to rise once more and, in spite of continuous vacuum pumping, reached a peak of somewhat less than one atmosphere as the temperature leveled off at about 1725° C. The reaction vessel was held at this temperature level for about 90 minutes after the pressure once again dropped to 100 microns to make certain that all parts of the reaction mass were uniformly heated and that the reaction had progressed to virtual completion. After the final heat soak period, the heating power was shut off and the reaction residue was allowed to cool under vacuum pumping conditions until the temperature thereof reached about 200° C. The vacuum pump was then shut off and the furnace allowed to cool to room temperature. The graphite crucible was removed from the furnace and 1235 parts by weight of a product having a tightly sintered silver grey appearance were recovered. Chemical analysis of the product showed that it contained two atoms of titanium for each atom of oxygen and each atom of carbon present therein. X-ray analysis of the product established that the structure thereof was substantially equivalent to that of titanium monoxide except that the lines were shifted slightly, indicating that a solid solution of titanium monoxide and titanium carbide had been formed.

Thus, the procedure described in this example has involved two consecutive reactions represented by the following equations:

(a) $\qquad 2TiO_2 + C \rightarrow Ti_2O_3 + CO$
(b) $\qquad Ti_2O_3 + 3C \rightarrow TiC \cdot TiO + 2CO$

*Example II*

$$Ti_2O_3 + 3C \rightarrow TiO.TiC + 2CO \qquad (4)$$

A reaction mixture comprising 1440 parts by weight of titanium sesquioxide substantially free from other oxides of titanium and 360 parts by weight of calcined lampblack was prepared. Both the titanium sesquioxide and the lampblack were in the form of minus 325 mesh powder and, after thorough mixing, were tamped into a graphite crucible having a sheet molybdenum liner covering the bottom thereof. Gas escape holes were pierced in the mass of reactants and the crucible was placed in the induction furnace used in Example I. The vacuum pump was started up and the pumping continued until the pressure in the furnace was lowered to about 50 microns of mercury. Thereupon, heating of the furnace was commenced and the temperature thereof raised to the level of about 1725° C. while continuing the active vacuum pumping. The pressure within the reaction vessel began to rise as the temperature reached about 1500° C. and the rise became quite pronounced as the temperature leveled off at 1725° C. The heating was continued to maintain the reaction temperature at the aforesaid level for about 90 minutes after the pressure dropped once again to below 100 microns to insure completion of the reaction. After allowing the reaction vessel to cool under substantially the same conditions as in Example I, approximately 1235 parts by weight of a tightly sintered silvery grey product was recovered which was shown by chemical and X-ray analysis to be a substantially pure solid solution of titanium monoxide and titanium carbide.

*Example III*

$$3TiO_2 + 5C \rightarrow TiC.2TiO + 4CO \qquad (5)$$

A reaction mixture composed of 2400 parts by weight of pigment grade titanium dioxide and 600 parts of calcined lampblack was thoroughly mixed and was charged to a molybdenum lined graphite crucible. The mixture was then heated in an induction furnace under the same conditions as were employed in Example I. After the final heat soak period, the furnace and reaction product were cooled under the same conditions as employed in Example I and 1870 parts by weight of a silver grey product was obtained. By chemical analysis, this product was found to contain 76.5% titanium, 6.5% carbon and 17.0% oxygen. These proportions are substantially equivalent to a compound consisting of a solid solution of titanium monoxide and titanium carbide in which there are present two molecules of titanium monoxide for each molecule of titanium carbide therein.

*Example IV*

$$2FeTiO_3 + 6C \rightarrow 2Fe + TiO.TiC + 5CO \qquad (6)$$

A reaction mixture was prepared by intimately mixing 3040 parts by weight of ilmenite containing 52.6% $TiO_2$ and 720 parts of calcined petroleum coke, and the mixture was tamped into a graphite crucible as before. The ilmenite had been purified by the usual methods of beneficiation and both reactants were in the form of minus 325 mesh powder. The graphite crucible was placed in an induction furnace fitted with a high speed vacuum pump and the furnace was evacuated until the pressure was reduced below about 100 microns of mercury. The reaction mass was thereupon heated to a temperature of about 1150° C. While the temperature was maintained at this level the pressure rose appreciably and then fell again to about 100 microns of mercury thus indicating completion of the reduction of the ilmenite to titanium sesquioxide and metallic iron. The reaction mass was held at 1150° C. for about 45 minutes after the pressure had dropped again to below 100 microns to insure substantial completion of the first reactions. The temperature of the reactants was then raised to about 1725° C. and was maintained at this level until the usual rise and subsequent drop in pressure indicated completion of the second stage of the process. The reaction mass was again held at the elevated temperature of 1725° C. for about 45 minutes after the pressure fell below about 100 microns to insure completion of the reaction. The mass was then allowed to cool to room temperature while continuing active vacuum pumping. The reaction product recovered from the crucible was crushed to minus 325 mesh. After magnetic separation of the iron from the balance of the reaction residue, 1150 parts by weight of a silver grey product was obtained which, on chemical and X-ray analysis, was shown to be a solid solution of titanium monoxide and titanium carbide in equimolar proportions.

As will be seen from the foregoing description of the practice of our invention, titanium dioxide and titanium sesquioxide may be reduced with elemental carbon to produce a product comprising a mutual solid solution of titanium carbide and titanium monoxide. The titanium carbide-monoxide product is substantially free from other oxides of titanium and is a valuable article of commerce, particularly useful in the production of metallic titanium by electrolytic processes in which the ultimate purity of the titanium metal produced depends to a large extent upon the purity of the starting materials employed.

We claim:

1. The method of producing a mutual solid solution of titanium carbide and titanium monoxide in which the molar ratio of the carbide to the monoxide does not exceed 1 which comprises forming an intimate mixture of substantially pure titanium dioxide with at least one-half mol but not more than 2 mols of elemental carbon per mol of titanium dioxide, heating the mixture to a reaction temperature within the range of about 1100° to 1200° C., removing the evolved carbon monoxide from the reaction zone, maintaining said reaction temperature until the evolution of carbon monoxide substantially ceases whereby titanium sesquioxide is formed substantially free from other oxides of titanium, thereafter heating an intimate mixture of the resulting substantially pure titanium sesquioxide and elemental carbon to a reaction temperature within the range of about 1500° to 1800° C., the molar amount of carbon in the mixture being greater than 1 but not more than 3 times that of the sesquioxide, removing the evolved carbon monoxide from the reaction zone, maintaining said reaction temperature until said evolution of carbon monoxide substantially ceases, and recovering the resulting mutual solid solution of titanium carbide and titanium monoxide.

2. The method of producing a mutual solid solution of titanium carbide and titanium monoxide in which the molar ratio of the carbide to the monoxide is 1 which comprises forming an intimate mixture of substantially pure titanium dioxide with at least one-half mol but not more than 2 mols of elemental carbon per mol of titanium dioxide, heating the mixture to a reaction temperature within the range of about 1100° to 1200° C., removing the evolved carbon monoxide from the reaction zone, maintaining said reaction temperature until the evolution of carbon monoxide substantially ceases whereby titanium sesquioxide is formed substantially free from other oxides of titanium, thereafter heating an intimate mixture of the resulting substantially pure titanium sesquioxide and elemental carbon to a reaction temperature within the range of about 1500° to 1800° C., the molar amount of carbon in the mixture being 3 times that of the sesquioxide, removing the evolved carbon monoxide from the reaction zone, maintaining said reaction temperature until said evolution of carbon monoxide substantially ceases, and recovering the resulting mutual solid solution of titanium carbide and titanium monoxide.

3. The method of producing a mutual solid solution of titanium carbide and titanium monoxide in which the molar ratio of the carbide to the monoxide does not exceed 1 which comprises forming an intimate mixture of substantially pure titanium dioxide with at least one-half mol but not more than 2 mols of elemental carbon per mol of titanium dioxide, heating the mixture to a reaction temperature within the range of about 1100° to 1200° C., removing the evolved carbon monoxide from the reaction zone, maintaining said reaction temperature until the evolution of carbon monoxide substantially ceases whereby titanium sesquioxide is formed substantially free from other oxides of titanium, thereafter heating an intimate mixture of the resulting substantially pure titanium sesquioxide and elemental carbon to a reaction temperature within the range of about 1700° to 1750° C., the molar amount of carbon in the mixture being greater than 1 but not more than 3 times that of the sesquioxide, removing the evolved carbon monoxide from the reaction zone, maintaining said reaction temperature until said evolution of carbon monoxide substantially ceases, and recovering the resulting mutual solid solution of titanium carbide and titanium monoxide.

4. The method of producing a mutual solid solution of titanium carbide and titanium monoxide in which the molar ratio of the carbide to the monoxide does not exceed 1 which comprises forming an intimate mixture of substantially pure titanium dioxide with at least one-half mol but not more than 2 mols of elemental carbon per mol of titanium dioxide, heating the mixture to a reaction temperature within the range of about 1100° to 1200° C., removing the evolved carbon monoxide from the reaction zone, maintaining said reaction temperature until the evolution of carbon monoxide substantially ceases whereby titanium sesquioxide is formed substantially free from other oxides of titanium, thereafter heating an intimate mixture of the resulting substantially pure titanium sesquioxide and elemental carbon to a reaction temperature within the range of about 1500° to 1800° C., the molar amount of carbon in the mixture being greater than 1 but not more than 3 times that of the sesquioxide, removing the evolved carbon monoxide from the reaction zone, maintaining said reaction temperature until said evolution of carbon monoxide substantially ceases, thereafter heating the resulting reaction product to a temperature sufficient to effect fusion of said reaction product, cooling the reaction product to room temperature, and recovering the resulting mutual solid solution of titanium carbide and titanium monoxide.

References Cited in the file of this patent

UNITED STATES PATENTS

| 2,155,682 | Ridgeway | Apr. 25, 1939 |
| 2,237,503 | Ridgeway | Apr. 8, 1941 |
| 2,364,123 | Benner et al. | Dec. 5, 1944 |
| 2,515,463 | McKenna | July 18, 1950 |

OTHER REFERENCES

Chem. Abstracts, 1945, pp. 4310.

Journal of the American Chemical Society, vol. 32, 1910, pp. 330–336.

Roscoe and Schorlemmer, Treatise on Chemistry, vol. II, 5th ed., 1913, pp. 808–819.

Lange, Handbook of Chemistry, 9th ed., 1956, p. 322.